US009122740B2

(12) United States Patent
Kaiser

(10) Patent No.: US 9,122,740 B2
(45) Date of Patent: Sep. 1, 2015

(54) BULK TRAVERSAL OF LARGE DATA STRUCTURES

(75) Inventor: Reiner K. Kaiser, Redondo Beach, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 419 days.

(21) Appl. No.: 13/418,433

(22) Filed: Mar. 13, 2012

(65) Prior Publication Data

US 2013/0246451 A1  Sep. 19, 2013

(51) Int. Cl.
*G06F 17/30* (2006.01)

(52) U.S. Cl.
CPC .... *G06F 17/30587* (2013.01); *G06F 17/30961* (2013.01)

(58) Field of Classification Search
CPC ..................... G06F 17/30112; G06F 17/30103
USPC .................................................. 707/687, 769
See application file for complete search history.

(56) References Cited

U.S. PATENT DOCUMENTS

| | | | |
|---|---|---|---|
| 5,499,367 A | 3/1996 | Bamford et al. | |
| 5,717,902 A | 2/1998 | D'Souza et al. | |
| 5,724,575 A | 3/1998 | Hoover et al. | |
| 5,873,075 A | 2/1999 | Cochrane et al. | |
| 6,101,507 A | 8/2000 | Cane et al. | |
| 6,125,369 A | 9/2000 | Wu et al. | |
| 6,397,125 B1 | 5/2002 | Goldring et al. | |
| 7,127,477 B2 | 10/2006 | Duncombe et al. | |
| 7,136,843 B2 | 11/2006 | Bigus et al. | |
| 7,343,364 B2 | 3/2008 | Bram et al. | |
| 7,401,104 B2 | 7/2008 | Shah et al. | |
| 7,412,432 B2 | 8/2008 | Kaminsky et al. | |
| 7,490,112 B1 | 2/2009 | Suresh et al. | |
| 7,493,344 B2 | 2/2009 | Wald et al. | |
| 7,496,573 B2 | 2/2009 | Westendorf | |
| 7,526,468 B2 * | 4/2009 | Vincent et al. | 1/1 |
| 7,536,678 B2 | 5/2009 | Kothari et al. | |
| 7,680,818 B1 | 3/2010 | Fan et al. | |
| 7,685,183 B2 | 3/2010 | Pace et al. | |
| 7,774,300 B2 | 8/2010 | Hsiao et al. | |
| 7,844,561 B2 | 11/2010 | Kaminsky et al. | |
| 8,126,844 B2 | 2/2012 | Kast | |
| 8,447,774 B1 * | 5/2013 | Robie et al. | 707/760 |
| 8,554,582 B2 * | 10/2013 | Ikeda | 705/4 |
| 2001/0005849 A1 | 6/2001 | Boothby et al. | |
| 2002/0165724 A1 | 11/2002 | Blankesteijn | |
| 2003/0120902 A1 | 6/2003 | Kottapalli et al. | |
| 2003/0208511 A1 | 11/2003 | Earl et al. | |

(Continued)

FOREIGN PATENT DOCUMENTS

WO   WO 9806046 A1   2/1998

*Primary Examiner* — Noosha Arjomandi

(57) ABSTRACT

A PDM system, method, and computer program product for traversing a large data structure including corresponding runtime objects. A method includes receiving traversal parameters including a plurality of unique object identifiers (UIDs) corresponding to objects in a data structure. The method includes receiving input objects, including input runtime objects, and closure rule clauses. The method includes configuring runtime objects, from the objects in the data structure, according to the traversal parameters, and storing the runtime objects in a temporary table. The method includes traversing the data structure and temporary table using the closure rules to produce traversed objects, and serializing and storing the traversed objects.

18 Claims, 3 Drawing Sheets

(56) References Cited

U.S. PATENT DOCUMENTS

| | | |
|---|---|---|
| 2003/0212681 A1 | 11/2003 | Kasper |
| 2004/0177075 A1* | 9/2004 | Rangadass ................... 707/10 |
| 2004/0250258 A1* | 12/2004 | Raghuvir et al. ............ 719/315 |
| 2005/0193028 A1 | 9/2005 | Oswalt |
| 2006/0143227 A1 | 6/2006 | Helm et al. |
| 2006/0161894 A1 | 7/2006 | Oustiougov et al. |
| 2007/0027936 A1 | 2/2007 | Stakutis et al. |
| 2007/0143321 A1* | 6/2007 | Meliksetian et al. ......... 707/101 |
| 2008/0016099 A1* | 1/2008 | Ikeda ........................ 707/102 |
| 2008/0077635 A1 | 3/2008 | Sporny et al. |
| 2008/0086480 A1* | 4/2008 | Srivastava et al. ............ 707/10 |
| 2008/0109496 A1 | 5/2008 | Holenstein et al. |
| 2008/0147603 A1* | 6/2008 | Kostamaa et al. .............. 707/3 |
| 2009/0319544 A1* | 12/2009 | Griffin et al. ................ 707/100 |
| 2010/0017395 A1 | 1/2010 | Wayn et al. |
| 2010/0050262 A1* | 2/2010 | Knapp et al. ..................... 726/25 |
| 2010/0274759 A1 | 10/2010 | Takeuchi et al. |
| 2011/0078122 A1* | 3/2011 | Mayer et al. .................. 707/687 |
| 2011/0167037 A1 | 7/2011 | Kaiser |
| 2011/0178998 A1* | 7/2011 | Nizami et al. ................ 707/694 |
| 2011/0179059 A1 | 7/2011 | Kaiser |
| 2011/0191299 A1 | 8/2011 | Huynh et al. |
| 2011/0252020 A1* | 10/2011 | Lim et al. ..................... 707/721 |

\* cited by examiner

BULK TRAVERSAL OF LARGE DATA STRUCTURES

CROSS-REFERENCE TO OTHER APPLICATION

The present application has some Figures or specification text in common with, but is not necessarily otherwise related to, U.S. patent application Ser. No. 13/418,424 for "Traversal-Free Updates in Large Data Structures", filed concurrently herewith, that is hereby incorporated by reference. Commonly-assigned U.S. Patent Applications 61/292,186 (filed Jan. 5, 2010), Ser. No. 12/984,656 (filed Jan. 5, 2011), Ser. No. 12/690,180 (filed Jan. 20, 2010), and Ser. No. 12/690,188 (filed Jan. 20, 2010) are also incorporated by reference herein.

TECHNICAL FIELD

The present disclosure is directed, in general, to data management systems and methods, including computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include a system, method, and computer program product for traversing a large data structure including corresponding runtime objects. A method includes receiving traversal parameters including a plurality of unique object identifiers (UIDs) corresponding to objects in a data structure. The method includes receiving input objects, including input runtime objects, and closure rule clauses. The method includes configuring runtime objects, from the objects in the data structure, according to the traversal parameters, and storing the runtime objects in a temporary table. The method includes traversing the data structure and temporary table using the closure rules to produce traversed objects, and serializing and storing the traversed objects.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
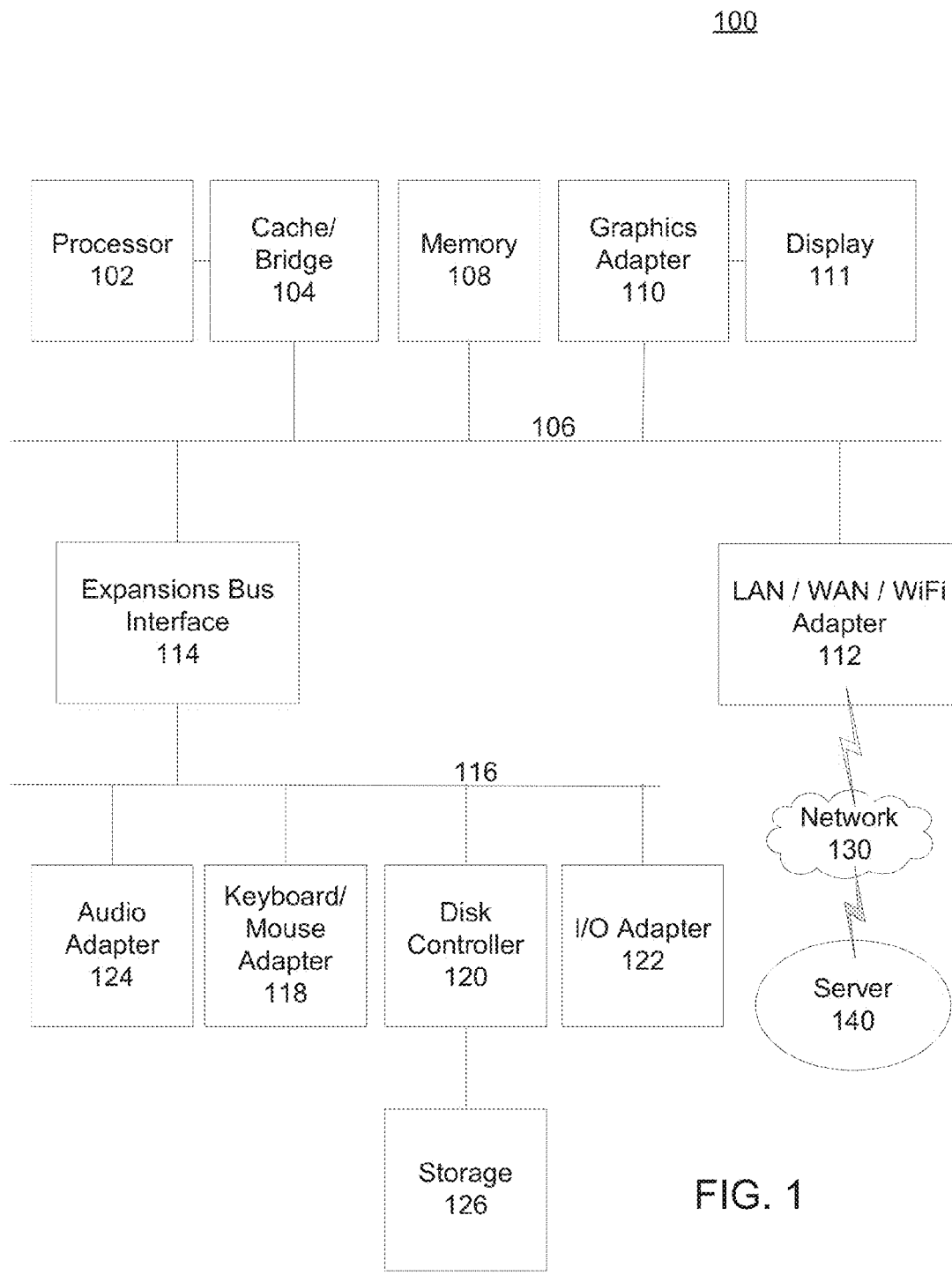
FIG. 1 depicts a block diagram of a data processing system in which an embodiment can be implemented.
Figure 2:
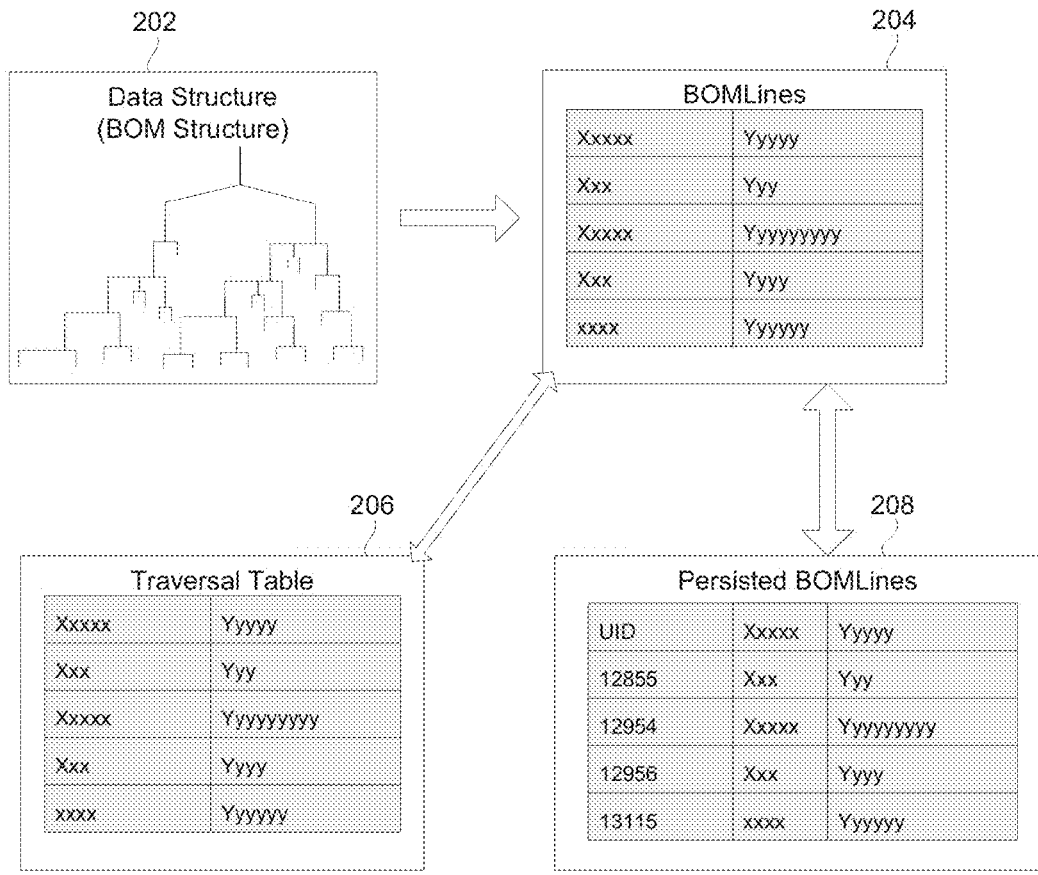
FIG. 2 depicts a simplified block diagram of various data structures and relations used in accordance with disclosed embodiments.
Figure 3:
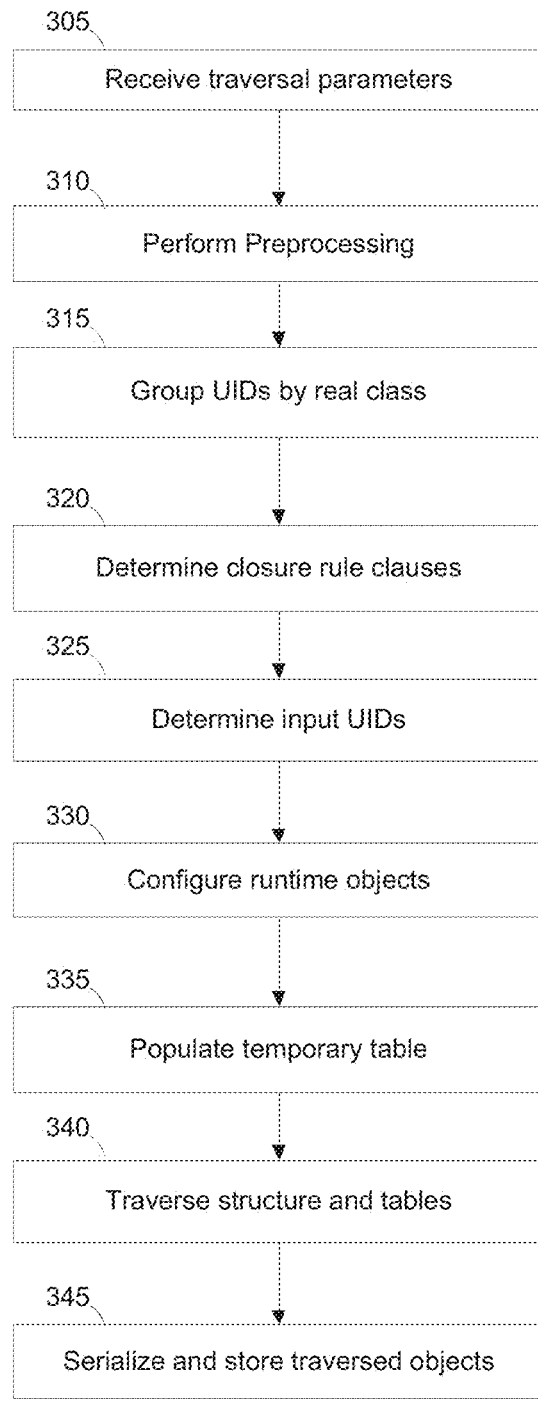
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Many data management systems, including PDM systems, that analyze, scope, visualize, and otherwise share information related to large configured product structures crucially depend on highly efficient algorithms to process such structures, in a high-performing, scalable manner. Today, many such applications are limited by the performance and scalability of such solutions since they typically rely on codeful and highly discretized processes to analyze, traverse, scope, and serialize such structures.

Closure rule based formalisms have been introduced to formalize and customize such traversals or scopings. A closure rule can be used to define what type of associated data gets exported or processed, and can include a sequence of clauses, each one defining a primary class, a secondary class, a relation, and an action. Such closure rules are typically interpreted and processed codefully, with negative impact on performance and scalability.

Disclosed embodiments, however, include systems and methods that can map a configured bill of materials (BOM) structure to database tables which can then be processed by executing SQL queries in bulk against a potentially large set of configured BOMLines. In doing so, very efficient processing of closure-rule based traversal of a configured BOM structure can be achieved.

FIG. 1 depicts a block diagram of a data processing system in which an embodiment can be implemented, for example as a PDM data processing system configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments describe processes relating to updating and publishing of large data structures. The techniques disclosed herein are particularly useful with BOM structures, and the specific examples described below related to BOM structures, but those of skill in the art will recognize that the disclosed techniques are not limited to BOM structure implementations, and can be applied to elements of other large data structures, not just the BOMLines of BOM structures as described in the examples below.

Disclosed techniques can perform a high speed generic traversal of an unconfigured (persisted) data model using a set of closure rules. One method for performing such a traversal is described in United States Patent Application Publication 2011/0179059, hereby incorporated by reference. These closure rules can reference Object table instances which exist in the database and are "compiled" into database queries which can then be executed recursively, for larger and larger sets of input objects as traversal continues. The end result of this traversal is a large list of objects, referenced by stable unique identifiers (UIDs), which can then be processed further.

This approach is very useful for persisted data, but has not previously been applicable to configured traversal of a BOM structure. One reason for this is that BOMLines cannot conventionally be represented as objects in a Database table.

FIG. 2 depicts a simplified block diagram of various data structures and relations used in disclosed processes, each of which can be stored in a storage or memory of one or more PDM data processing systems as described herein.

In this example, the system stores and maintains a BOM structure 202. Data from the BOM structure 202 can be extracted, based on appropriate configurations, contexts, or queries, into BOMLines 204. In a PDM context, BOMLines are runtime objects.

In order to make "computed" runtime objects such as BOMLines available to generic closure-rule-based traversal via database queries, disclosed embodiments use one or more temporary traversal tables 206 that contain a set of BOMLines required for further analysis.

As the system traverses through the list of clauses defined for both persisted and non-persisted objects, the system will encounter a clause referring to a runtime object (such as a BOMLine). In contrast to conventional approaches, the system can process these runtime objects by first placing them in one or more temporary traversal tables 206.

The system generates the objects to be traversed, in a conventional manner, and stores them in the temporary traversal table 206, as needed. The system can also generate any child line objects based on the traversal rules and populate them into the temporary traversal table(s) 206.

The system then performs a bulk traversal process on the temporary traversal tables 206.

The system can also perform a join process between the temporary traversal table 206 and any permanent tables, therefore enabling scoping and traversal of both runtime objects and the persisted data model. In this way, the system can mix persisted data with non-persisted data. In certain embodiments, database queries can be formulated to join the temporary tables with any persisted tables, so once the corresponding BOMLines or other runtime objects have been collected, they can be combined with persisted objects. The system can also ensure that all properties required for this traversal have been correctly added to the temporary table elements.

In some embodiments, the system maintains a persisted identification of runtime objects, as illustrated by persisted BOMLines table 208, in addition to or in place of the temporary tables described above. A stable identity for a BOMLine, such as a UID, is used to identify this line in the persisted BOMLines table 208 and ensure that repeated traversal and scoping of the line avoids re-calculation. Such stable identities can be constructed, for example, using hashing formalisms and defining UIDs based on un-modifiable properties of this line. In some cases, this can be, for example, the sequence of parent-child relationships of the line to top of the structure plus sequence number/find number of the BOMLine.

FIG. 3 depicts a flowchart of a process in accordance with disclosed embodiments, for traversing a large data structure in a PDM data processing system. In this example, the structure is a BOM data structure, and the traversal can include traversing BOMLines as described. The BOMLine can describe, for example, a configured product, part, or assembly. Of course, these techniques are not limited to the BOM structure or the BOMLines described in this example, but are applicable to traversing any large data structure including corresponding runtime objects.

The system can receive the traversal parameters (step 305), which can include UIDs and configuration parameters. The configuration parameters can define runtime objects to be generated from the large data structure. Receiving, as used herein, can include loading from storage, receiving from another device or process, receiving via an interaction with a user, or otherwise.

The system can perform any necessary preprocessing (step 310). This step can include receiving or identifying the input objects, including finding class IDs and runtime classes, receiving closure rule clauses, or generating any temporary tables that may be required as described herein The system can group the UIDs by real class (step 315). Each UID can have an associated real class.

The system can determine the closure rule clauses to be evaluated for each class or group (step 320).

The system can determine the UIDs to be input for each group and corresponding closure rule clauses (step 325).

The system can configure new BOMLines or other runtime objects from the BOM structure or other large data structure according to the traversal parameters (step 330).

The system can populate a temporary table with the BOMLines or other runtime objects (step 335). This can be performed by populating a temporary traversal table or persisted BOMLines table as described above.

The system traverses the large data structure and temporary tables using the closure rules (step 340). This can include traversing the BOM structure and the temporary traversal table or persisted BOMLines table. This step can include constructing database queries corresponding to the closure rule clauses and executing the queries on the large data structure and tables for any of the input UIDs. This step can be performed recursively to traverse the entire structure, or can include repeating the steps from step 315 above. This step can include evaluating any process-only closure rule clauses.

The system serializes and stores the traversed objects (step 345).

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to an of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a product data management (PDM) data processing system, comprising:
receiving traversal parameters including a plurality of unique object identifiers (UIDs) corresponding to objects in a data structure;
receiving input objects, including input runtime objects, and closure rule clauses;
configuring runtime objects, from the objects in the data structure, according to the traversal parameters;
storing the runtime objects in a temporary table;
constructing database queries corresponding to the closure rule clauses;
executing the database queries on the data structure and the temporary table;
traversing the data structure and the temporary table using the closure rules to produce traversed objects; and
serializing and storing the traversed objects.

2. The method of claim 1, wherein the traversal parameters include configuration parameters defining runtime objects.

3. The method of claim 1, wherein the data structure is a bill of materials (BOM) structure, and the runtime objects are BOMLines.

4. The method of claim 1, wherein the PDM data processing system groups the UIDs by associated real classes.

5. The method of claim 4, wherein the PDM data processing system determines UIDs to be input for each group and associated closure rule clauses.

6. The method of claim 1, wherein the PDM data processing system also evaluates process-only closure rule clauses.

7. A product data management (PDM) data processing system comprising a processor and accessible memory, the data processing system particularly configured to:

receive traversal parameters including a plurality of unique object identifiers (UIDs) corresponding to objects in a data structure;
receive input objects, including input runtime objects, and closure rule clauses;
configure runtime objects, from the objects in the data structure, according to the traversal parameters;
store the runtime objects in a temporary table;
construct database queries corresponding to the closure rule clauses;
execute the database queries on the data structure and the temporary table;
traverse the data structure and the temporary table using the closure rules to produce traversed objects; and
serialize and store the traversed objects.

8. The PDM data processing system of claim 7, wherein the traversal parameters include configuration parameters defining runtime objects.

9. The PDM data processing system of claim 7, wherein the data structure is a bill of materials (BOM) structure, and the runtime objects are BOMLines.

10. The PDM data processing system of claim 7, wherein the PDM data processing system groups the UIDs by associated real classes.

11. The PDM data processing system of claim 10, wherein the PDM data processing system determines UIDs to be input for each group and associated closure rule clauses.

12. The PDM data processing system of claim 7, wherein the PDM data processing system also evaluates process-only closure rule clauses.

13. A non-transitory computer-readable storage medium encoded with computer-executable instructions that, when executed, cause a product data management (PDM) data processing system to:
receive traversal parameters including a plurality of unique object identifiers (UIDs) corresponding to objects in a data structure;
receive input objects, including input runtime objects, and closure rule clauses;
configure runtime objects, from the objects in the data structure, according to the traversal parameters;
store the runtime objects in a temporary table;
construct database queries corresponding to the closure rule clauses;
execute the database queries on the data structure and temporary table;
traverse the data structure and the temporary table using the closure rules to produce traversed objects; and
serialize and store the traversed objects.

14. The computer-readable storage medium of claim 13, wherein the traversal parameters include configuration parameters defining runtime objects.

15. The computer-readable storage medium of claim 13, wherein the data structure is a bill of materials (BOM) structure, and the runtime objects are BOMLines.

16. The computer-readable storage medium of claim 13, wherein the PDM data processing system groups the UIDs by associated real classes.

17. The computer-readable storage medium of claim 16, wherein the PDM data processing system determines UIDs to be input for each group and associated closure rule clauses.

18. The computer-readable storage medium of claim 13, wherein the PDM data processing system also evaluates process-only closure rule clauses.

* * * * *